United States Patent [19]

Risberg

[11] 4,435,632

[45] Mar. 6, 1984

[54] THREE PHASE SQUARE WAVE WELDING POWER SUPPLY

[75] Inventor: Robert L. Risberg, New Berlin, Wis.

[73] Assignee: Hobart Brothers Company, Troy, Ohio

[21] Appl. No.: 348,531

[22] Filed: Feb. 12, 1982

[51] Int. Cl.³ ............................................. B23K 9/09
[52] U.S. Cl. ........................... 219/130.51; 219/137 PS
[58] Field of Search ...................... 219/130.51, 130.31, 219/130.32, 130.33, 137 PS

[56] References Cited

U.S. PATENT DOCUMENTS

| | | |
|---|---|---|
| 3,364,334 | 1/1968 | Sato et al. . |
| 3,845,380 | 10/1974 | Lepp et al. . |
| 3,989,922 | 11/1976 | Fahey .............................. 219/130.51 |
| 3,999,034 | 12/1976 | Barhorst . |
| 4,038,515 | 7/1977 | Risberg . |
| 4,092,517 | 5/1978 | Woodacre ..................... 219/137 PS |
| 4,180,720 | 12/1979 | Barhorst . |
| 4,247,752 | 1/1981 | Stringer .......................... 219/130.33 |

FOREIGN PATENT DOCUMENTS 2829595  2/1979  Fed. Rep. of Germany ........................ 219/130.33

*Primary Examiner*—C. C. Shaw

*Attorney, Agent, or Firm*—Biebel, French & Nauman

[57] ABSTRACT

In a three phase welding power supply, the three phase power is connected to a welding arc by a power control circuit having three conducting paths for straight polarity current and three conducting paths for reverse polarity current. The power control circuit comprises a three phase bridge rectifier circuit having eight bridge arms each including a silicon controlled rectifier with the bridge circuit being connected between the three phase power source and the welding arc which is in turn connected to the three phase power supply neutral. An inductor is connected across the direct current terminals of the bridge circuit so that arc current flows in one direction through the inductor regardless of the polarity of the arc current. The conducting paths are selectively activated at non-zero voltage points to conduct repetitive sequences of independent numbers of straight polarity half cycles of arc current followed by independent numbers of reverse polarity half cycles of arc current to the welding arc. Pulses are generated in synchronism with each of the three power phases and counted to determine the activation sequences of the conducting paths. By controlling the generation of the pulses and the counts of the pulses at which the paths are activated, a variety of sequences are generated.

15 Claims, 9 Drawing Figures

THREE PHASE SQUARE WAVE WELDING POWER SUPPLY

BACKGROUND OF THE INVENTION

This invention relates to a welding power supply operated from a three phase power input for use in inert gas arc welding, and more particularly to such a supply wherein independent numbers of consecutive half cycles of each polarity of the three phase power input are passed to the welding arc to generate an asymmetrical arc current.

The use of square wave bipolar arc currents is well known in the prior art. Such currents are particularly useful for inert gas arc welding using nonconsummable electrodes, such as tungsten, commonly referred to as tungsten inert gas (TIG) welding. The use of a square wave bipolar welding current provides a cleaning action of the workpiece with the reverse polarity current (electrode positive relative to the workpiece) while providing maximum welding efficiency via straight polarity current (electrode negative relative to the work piece).

For each polarity reversal, the arc current goes through zero and, accordingly, the arc must be reignited to provide currrent flow for the reversed polarity of arc current. Current reversals can create reignition problems when the reversal is attempted at low voltage levels. Arc reignition is a particular problem for current reversals from straight polarity to reverse polarity since the relatively cool base metal is not as good an emitter as the hot tungsten electrode. Even for current reversals from reverse polarity to straight polarity, it is advantageous to perform the current reversal at high voltage levels to insure arc reignition.

The problem of arc reignition in square wave welding has been handled for example by silicon controlled rectifier (SCR) circuits wherein SCR conduction is not initiated until the welding supply voltage level reaches a defined magnitude or defined phase angle relative to the zero crossing point. See, for example, U.S. Pat. No. 3,845,380 which describes a current stabilizer wherein current transitions are performed by SCR's activated by saturable reactors so that the current transitions occur at non-zero levels of the welding supply voltage.

Other known welding supply circuits provide arc current reversals by switching between two independent direct current (DC) power supplies by commutating SCR's or by connecting a single DC power supply to an arc via a commutated SCR bridge circuit. See, for example, U.S. Pat. Nos. 3,999,034 and 4,180,720 which are assigned to the assignee of the present application. These welding supplies further provide the benefit of generating an asymmetrical current waveform, i.e., adjusting the duty cycle so that straight polarity current is applied to the arc for a different portion (normally greater portion) of each cycle than reverse polarity current. By adjusting the duty cycle, a selected amount of "cleaning" arc current or reverse polarity arc current can be provided depending upon the composition and condition of the workpiece. This permits a maximum portion of straight polarity current to be provided to the arc to more efficiently perform the weld. While these welding power supplies provide versatility and superior welding performance, the commutation circuits for the SCR's are expensive.

An asymmetrical single phase alternating current welding supply is provided in accordance with U.S. Pat. No. 4,038,515 by independently selecting the non-zero voltage points at which the straight and reverse polarity currents are initiated, i.e., the time phases at which SCR bridge paths are made to conduct. The independent selection of the non-zero voltage points for initiation of the straight and reverse polarity currents generates an asymmetrical arc current waveform by imbalancing the conduction angles for the two polarities of arc current. However, imbalancing the conduction angles of the straight and reverse polarity currents to the arc leads to partial saturation of the power transformer. Such transformer saturation causes high primary current flow which includes a reactive current component, generates harmonics on the power line, creates a low power factor, and produces heating in the power transformer primary and the distribution transformer, all of which result in inefficient operation and higher billing charges from the power distributing company.

SUMMARY OF THE INVENTION

In accordance with the present invention, an alternating polarity square wave welding current is generated from a three phase power input. The three phase power is connected to the welding arc by a power control circuit having three conducting paths for straight polarity current and three conducting paths for reverse polarity current. Inductor means is connected into the conducting paths so that arc current flows in one direction through the inductor means regardless of the polarity of the arc current. The conducting paths of the power control circuit are activated at selected non-zero voltage points by path switching means synchronized with the three phase power. Timing means, also synchronized with the three phase power, control the path switching means to selectively activate the conducting paths in repetitive sequences to conduct independent numbers of straight polarity half cycles of arc current followed by independent numbers of reverse polarity half cycles of arc current from the three phase power input to a welding arc.

Arc current reversals are preferably effected by activating the conducting paths for two consecutive half cycles of the same power phase which results in the rapid reversal of the polarity of the arc current. Such operation to effect arc current reversals permits the use of a minimum inductance for the inductor means.

When the conducting paths for two consecutive half cycles of the same power phase are activated sequentially, the conducting path for the first half cycle maintains arc current conduction of the polarity corresponding to the first half cycle into the second half cycle by means of inductive current generated by the inductor means. The energy stored in the inductor means thus extends the first half cycle current polarity into the second half cycle of the power phase. When the conducting path for the second half cycle of the same power phase is then activated, the applied voltage is opposite to the polarity of the inductive arc current. The conducting path for the second half cycle cooperates with the conducting path for the first half cycle to circulate the inductive current through the conducting paths so that the voltage of the second half cycle will rapidly reverse the arc current.

The conducting path for the first half cycle is deactivated by the line voltage of the last connected power phase, i.e., line commutated, and arc current is maintained in the reversed polarity by the second half cycle of the power phase. The second half cycle of the reversing power phase, together with any succeeding half cycles of the same polarity from the other power phases which are activated, restore the energy in the inductor means to provide sufficient energy for the next arc current reversal.

The switching means includes threshold signal generating means for selecting the non-zero voltage points at which the conducting paths are activated. Comparator means are provided for comparing the voltage levels of the power phases to the threshold signals for activating the conducting paths when the threshold signals are exceeded.

In accordance with one aspect of the present invention, pulse signals are generated in synchronism with the three phase power and the path switching means is enabled in response to selected counts of the pulses so generated. Counter means is provided for counting the pulses and gating means is selectively coupled to the counter means for enabling the path switching means at selected pulse counts of the counter means.

The pulse counts at which the conducting paths are activated and the generation of the pulses by the pulse generator are selected to vary the number of straight polarity half cycles and reverse polarity half cycles which are conducted to the arc for given operating sequences. Accordingly, the proportion of straight polarity arc current and reverse polarity arc current for each welding arc current cycle can be selected.

In accordance with a first sequence, a single pulse is generated for each cycle of each phase of the three phase power with each pulse being generated at a defined phase angle relative to the positive going zero crossing of the phase voltage. The counter means repetitively counts four (4) pulses from the pulse generator with the fourth pulse resetting the counter means so that the next four (4) pulses can be counted. The path switching means is enabled to activate the conducting paths corresponding to the power phase causing each fourth count of the counter means.

For a second sequence, a single pulse is generated for each cycle of the three phase power with each pulse being generated at a defined phase angle relative to the positive going zero crossing of the phase voltage. The counter means repetitively counts five (5) pulses from the pulse generator with the fifth pulse resetting the counter means so that the next five (5) pulses can be counted. The path switching means is enabled to activate the conducting paths corresponding to the power phases causing each fourth count and fifth count of the counter means.

A third sequence is constructed by generating a single pulse for each half cycle of each phase of the three phase power with each pulse being generated at a defined phase angle relative to the zero crossings of the phase voltage. The counter means repetitively counts five (5) pulses from the pulse generator with the fifth pulse resetting the counter means so that the next five (5) pulses can be counted. The path switching means is enabled to activate the conducting paths corresponding to the phase causing each fifth count of the counter means. Additional counting sequences can be generated to provide alternate portions of straight polarity and reverse polarity current to the arc.

In accordance with another aspect of the present invention, the activation of the reverse polarity conducting paths is limited to a range of voltages near the maximum voltage of the three phase power supply to help insure reignition of the arc for current reversals from straight polarity to reverse polarity. The preferable range of conduction angles for activation of the reverse polarity conducting paths is a range between 70° and 110° from the zero crossing point for the reverse polarity half cycles. The activation of the straight polarity conducting paths is similarly limited to a range of voltages toward the maximum voltage of the three phase supply. However, since reignition is easier for current transitions from reverse polarity to straight polarity, the range is larger, preferably being between 40° and 140' from the zero crossing point for the straight polarity half cycles.

In accordance with another aspect of the present invention, the power control circuit comprises a bridge circuit constructed from gate controlled thyristors, preferably silicon controlled rectifiers (SCR's), with the alternating current (AC) input of the bridge circuit being connected to the three phase power input and the inductor means being connected across the direct current (DC) terminals of the bridge. Advantageously, the SCR's comprising the conducting paths of the present invention are line commutated and thereby the expensive commutation circuits often required in prior art circuits are eliminated.

Since only half cycles of the input three phase power are connected to the welding arc, the power transformer resets to avoid the saturation problems noted in the prior art. The use of three phase power also helps to avoid the saturation problems because the conduction of alternating phases also tends to reset the transformer.

It is an object of the present invention to provide an alternating polarity square wave welding supply driven by three phase power wherein independent numbers of straight polarity half cycles of arc current followed by independent numbers of reverse polarity half cycles of arc current are repetitively and selectively connected to a welding arc to supply arc current thereto.

It is another object of the present invention to provide an alternating polarity square wave welding supply driven by three phase power wherein SCR circuits are line commutated to provide an inexpensive welding supply.

It is a further object of the present invention to provide an alternating polarity square wave welding supply driven by three phase power wherein the frequency of the arc current is a fraction of the frequency of the three phase power to thereby reduce the noise level of the welding arc.

Other objects and advantages of the invention will be apparent from the following description, the accompanying drawings and the appended claims.

BRIEF DESCRIPTION OF THE DRAWINGS

FIG. 2 is a schematic diagram of the circuitry for activating the SCR's comprising the conducting paths of the power control circuit shown in FIG. 1;

FIG. 3 is a schematic diagram of the circuitry for generating threshold signals which determine the conduction angles for the conducting paths of the power control circuit shown in FIG. 1;

FIG. 4 is a schematic diagram of a pulse generating circuit used in sequencing the activation of the conducting paths of the power control circuit shown in FIG. 1; and FIG. 5 is a schematic diagram of the counting circuit and inhibit/enable circuitry for counting the pulses generated by the pulse generating circuit of FIG. 4 and selectively inhibiting/enabling the path activating circuitry of FIG. 2.

DETAILED DESCRIPTION OF THE INVENTION

Figure 1:
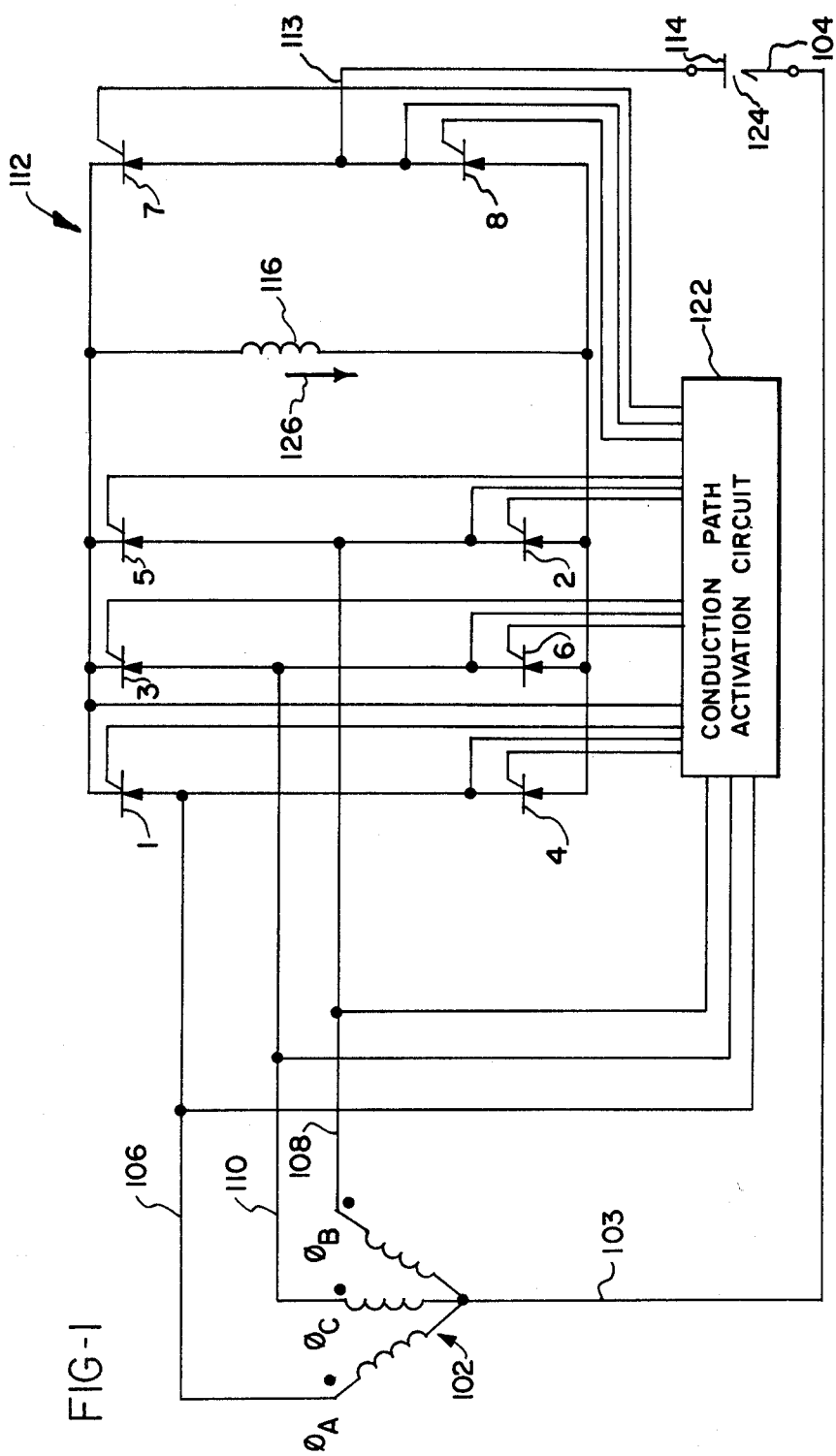
FIG. 1 is a schematic diagram of a welding power supply in accordance with the present invention showing in detail the power control circuit.

With reference now to the drawings, FIG. 1 is a schematic diagram of a welding power supply in accordance with the present invention particularly showing the arc current carrying circuitry of the power supply. A three phase wye connected power transformer 102 has its common conductor 103 connected to a welding electrode 104 and its three power phase conductors 106, 108, 110 connected to the three phase inputs of a three phase bridge circuit 112 comprising gate controlled thyristors and preferably silicon controlled rectifiers (SCR's) 1–8. The common alternating current (AC) output 113 of the three phase bridge 112 is connected to a workpiece 114. An inductor 116 is connected across the direct current (DC) terminals of the three phase bridge 112. Either straight polarity or reverse polarity DC welding current can also be generated by the supply of the present invention as will be described hereinafter.

Figure 6:
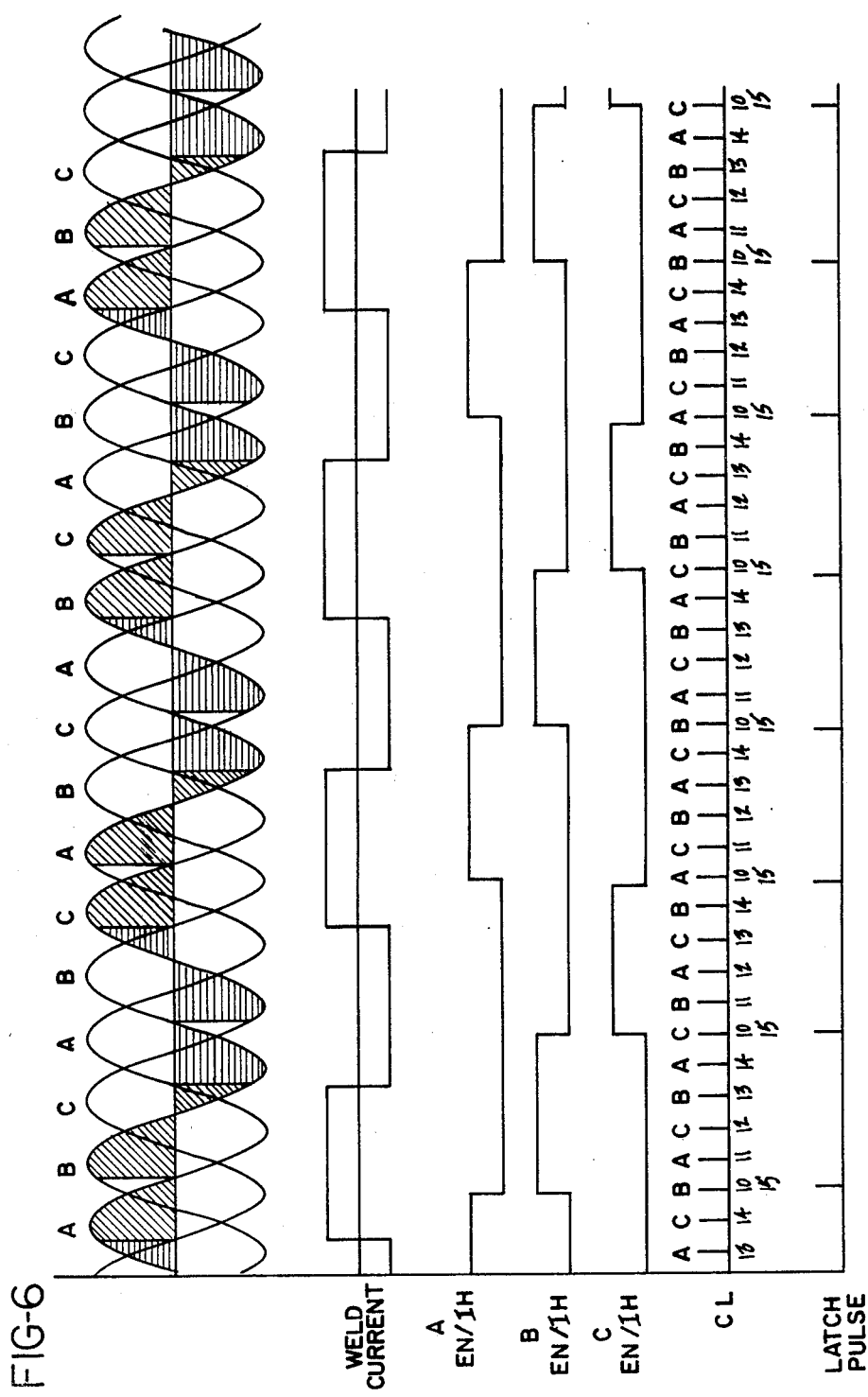
FIGS. 6–8 show circuit waveforms generated to produce three preferred duty cycles for the arc current generated by the power supply of the present invention.
Figure 7:
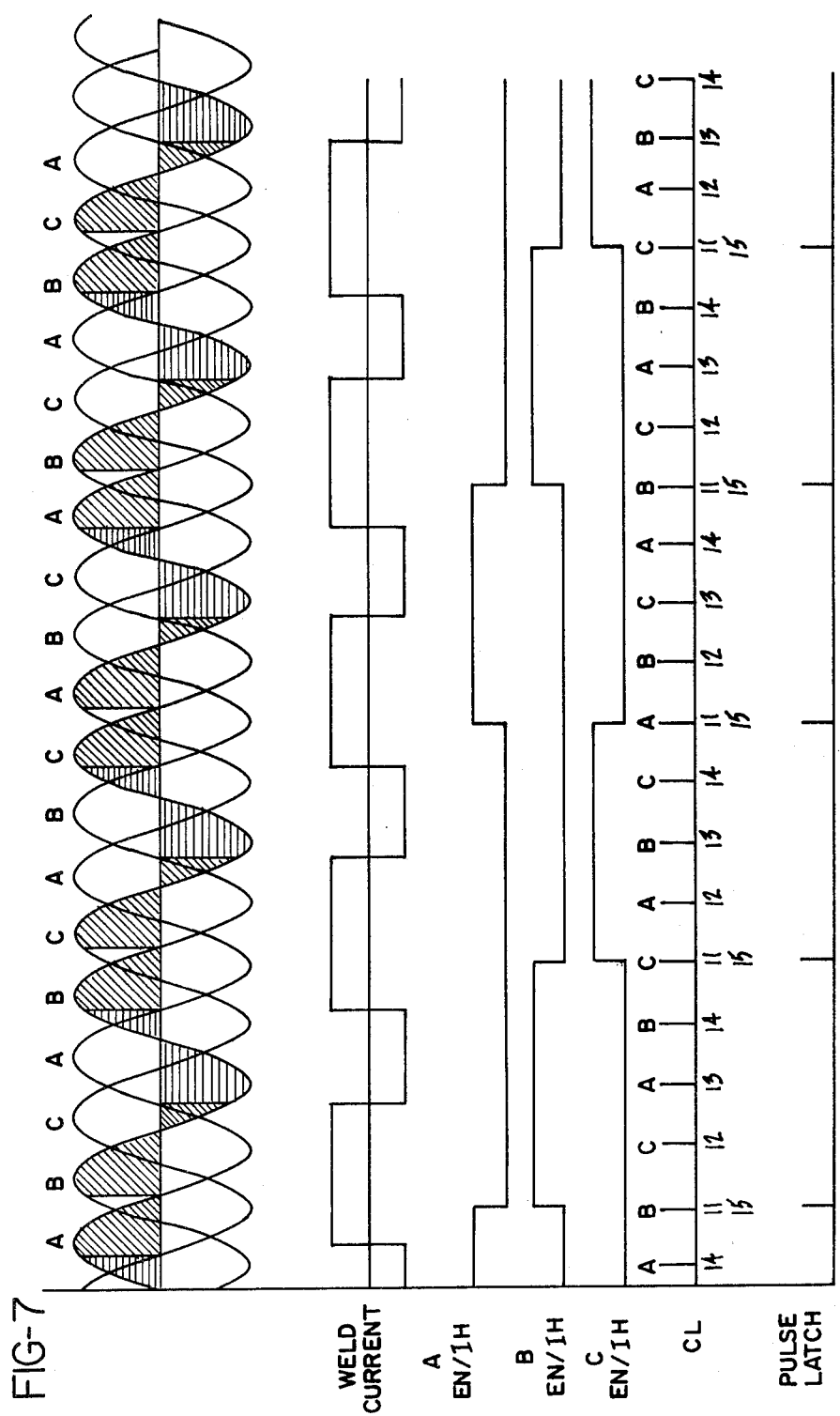
Figure 8:
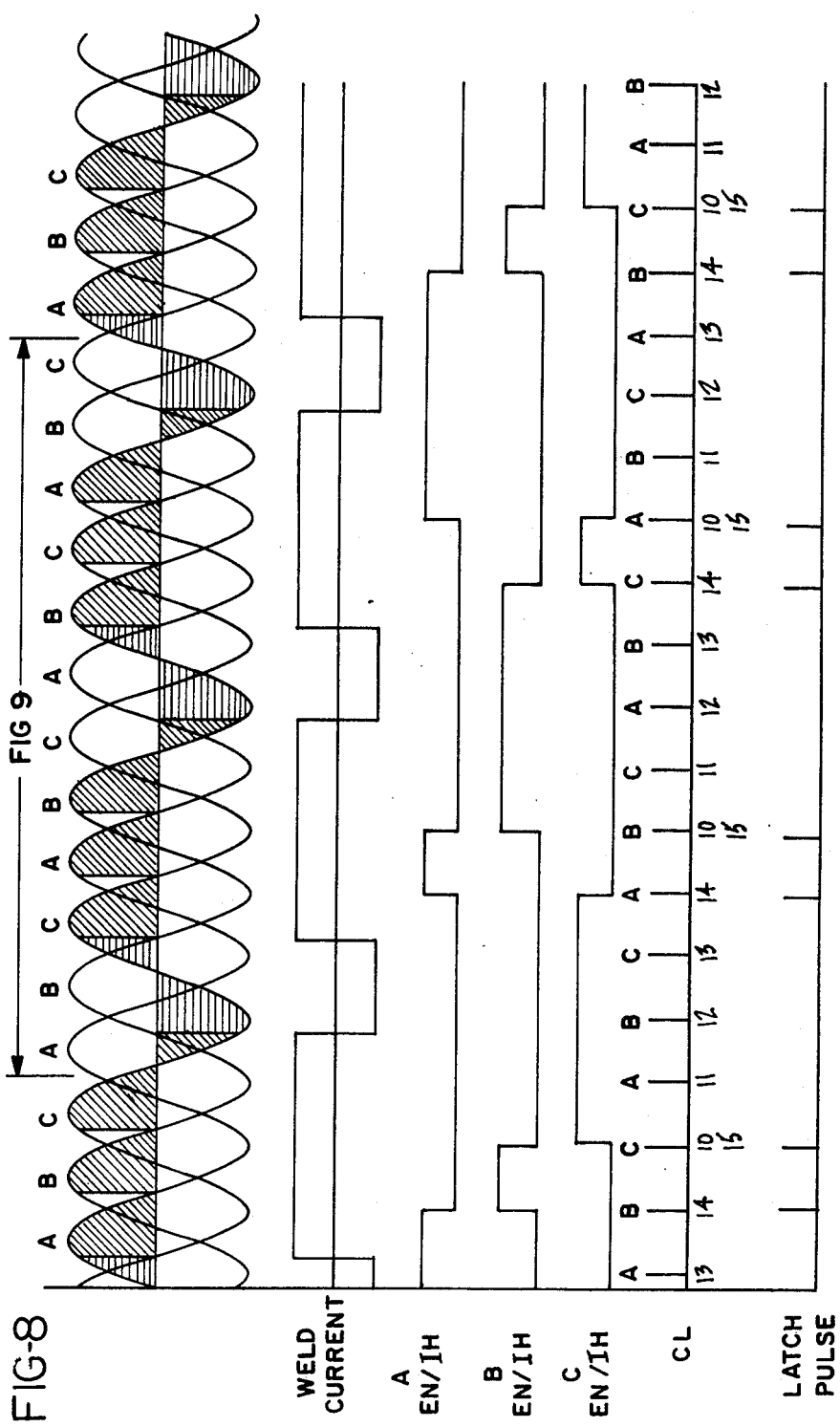

The bridge circuit 112 comprises three conducting paths for conducting straight polarity arc current half cycles and three conducting paths for conducting reverse polarity arc current half cycles to the welding arc. Each conducting path includes the inductor 116. The three straight polarity conducting paths comprise the SCR pairs 1,8; 3,8; and 5,8, while the reverse polarity half cycle conducting paths comprise the SCR pairs 4,7; 6,7; and 2,7. These conducting paths under the control of a conduction path activation circuit 122 selectively connect the three phase power from the conductors 106, 108, 110 to the welding arc 124. The conducting paths are activated in repetitive sequences to conduct independent numbers of straight polarity and reverse polarity half cycles from the three power phases ØA, ØB, and ØC to the welding arc 124 to generate a variety of arc current duty cycles as best seen in FIGS. 6–8. The conduction path activation circuit 122 is shown in detail in the schematic diagrams of FIGS. 2–5.

Due to the polarity of the connection of the welding supply to the welding electrode 104 and the workpiece 114, positive half cycles of the three phase input power, shown as the top waveforms in FIGS. 6–8, correspond to straight polarity arc current while negative half cycles correspond to reverse polarity arc current. Accordingly, hereinafter positive half cycles will be used interchangeably with straight polarity arc current and negative half cycles will be used interchangeably with reverse polarity arc current. Of course, this correspondence is relative and can be reversed by reversing the connections of the welding supply to the electrode 104 and the workpiece 114.

An important feature of the present invention is that it provides line commutation of the conducting paths, i.e., the voltage of the phase of a conducting path activated by the path activation circuit 122 turns off the previously activated conduction path. Such line commutation substantially reduces the cost of welding supplies constructed in accordance with the present invention.

Operation of the line commutation can be seen by reference to FIG. 1 and the voltage waveforms of the three phase power shown as the top waveform in FIGS. 6, 7 and 8. With reference to FIG. 6, the straight polarity or positive conducting path for ØA, i.e., SCR's 1 and 8 (through the inductor 116), are activated and conduct for the latter portion of the first complete positive half cycle labeled A in FIG. 6. Next, the positive half cycle conducting path for phase B is activated at approximately 60° after the positive going zero crossing portion of the phase B waveform. This conducting path comprises the SCR's 5 and 8 (through the inductor 116).

A review of the voltages applied to the SCR's comprising the two conducting paths, i.e., SCR 1 and 8 and SCR 5 and 8, at the point of activation of the positive half cycle of the B phase will show that current flows through SCR 5 in the forward direction and would attempt to flow through SCR 1 in the reverse direction. Thus, SCR 1 and the conducting path for the positive half cycle of the A phase of the three phase power input is turned off by the line voltages of the three phase power supply. Evaluations at each of the activation points, i.e., approximately 60° after zero crossing on either the positive or negative half cycles, as shown in FIGS. 6–8, will verify that similar conditions exist at each of these points. Accordingly, the line voltage connected by each activated conduction path serves to deactivate the preceeding active conduction path.

Arc current reversals are preferably effected by activating conducting paths for two consecutive half cycles of the same power phase. For example, in FIG. 6, the first negative going current transition is effected by activating the SCR's of the positive conducting path for phase B, i.e., SCR's 5 and 8, followed by the activation of the negative conducting path for phase B, i.e., SCR's 2 and 7. It is initially noted that the current flow through the inductor 116 is always in the direction of the arrow 126 regardless of the polarity of the current at the welding arc 124. The inductor 116 has a sufficient inductance to maintain arc current flow in opposition to the voltage of the second half cycle of a connected power phase. Such inductive arc current is terminated only by the activation of a second conducting path.

Although inductive arc current flow is portrayed in FIGS. 6–8 only for arc current reversals, inductive arc current also often flows where consecutive half cycles of the same polarity are conducted as will be described hereinafter. FIGS. 6–8 are shown with inductive current flowing only for arc current reversals for the sake of simplicity and ease of description. It is further noted that arc current reversals could be effected by different power phases; however, operation under such conditions requires a larger inductor and, hence, is not preferred.

The conduction path activation circuit 122 activates conduction paths comprising the SCR's 1–8 as previously identified to conduct positive (straight polarity) and negative (reverse polarity) half cycles of the three phase power input as shown in FIGS. 6–8. The flow of straight polarity arc current is identified by 45° cross-hatching and the flow of reverse polarity arc current is identified by horizontal cross-hatching on the three phase power waveforms shown in FIGS. 6–8.

Figure 2:
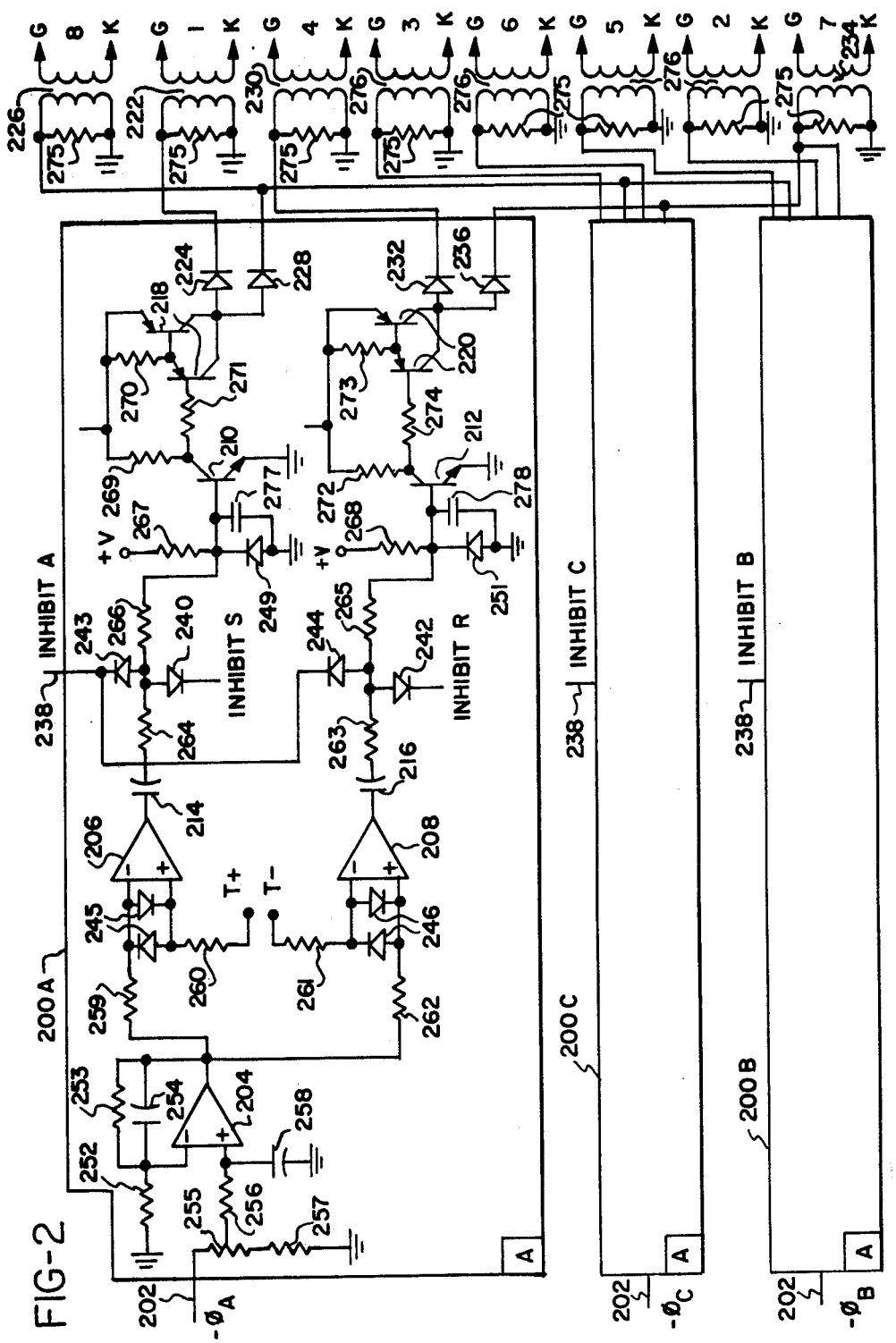
FIGS. 2 through 5 in combination are a detailed schematic diagram of the conduction path activation circuit of FIG. 1 and in particular.

FIG. 2 is a schematic diagram of the circuitry for activating the conducting paths previously identified as comprising pairs of the SCR's 1–8. The conducting paths are activated at selected phase angles of the corresponding three phase voltage waveforms. The phase angle at which a conducting path is activated is selected by comparing a phase shifted voltage waveform with threshold signals $T_+$ and $T_-$ generated by the circuitry shown in FIG. 3. A phase shifted waveform is used so that a rapidly changing portion of the input power waveform can be utilized to more accurately select the conduction angles for the power half cycles. This is done since the conduction angles are defined on generally slowly changing, higher voltage portions of the waveforms so that if the waveforms were used directly, the accuracy of selection of the conduction angles would be substantially reduced.

Since the conducting path activating circuits are identical for each of the three phases, only the path activating circuit 200A for phase A as shown in detail in FIG. 2 will be described. The path activating circuits 200B for phase B and 200C for phase C are indicated by boxes labeled A. The phase voltage is inverted electronically or by a secondary winding (not shown) of the transformer 102 and connected to a conductor 202 which passes the inverted phase voltage through an operational amplifier 204. The operational amplifier 204 is connected to both filter the inverted input signal and provide a 90° phase shift. The phase shifted signal at the output of the operational amplifier 204 is connected to comparators 206 and 208 which are also connected to the threshold signals T+ and T-, respectively.

The comparator 206 compares the phase shifted signal from the amplifier 204 to the threshold signal $T_+$ to determine the phase angle of the A power phase at which the SCR's 1 and 8 of the corresponding positive conducting path are activated. The comparator 208 compares the phase shifted signal from the operational amplifier 204 to the threshold signal $T_-$ to determine the phase angle of the A power phase at which the SCR's 4 and 7 of the corresponding negative conducting path are activated.

For positive transitions of the output signals of the operational amplifiers 206 and 208, pulse signals are generated which drive the transistors 210 and 212, respectively, through the capacitors 214 and 216. The pulse activation of the transistors 210 and 212 activate the darlington pair transistors 218 and 220, respectively, to drive the pulse transformers to activate the SCR's of the bridge circuit 112 which comprise the conducting paths for the A power phase. The darlington pair transistors 218 drive transformer 222 through a diode 224 with the pulse transformer 222 in turn driving the gate of the SCR 1 by connection across the gate and cathode of the SCR 1. The darlington pair 218 also drives the transformer 226 through a diode 228 with the pulse transformer 226 driving the gate of the SCR 8 by connection across the gate and cathode of the SCR 8. The darlington pair transistors 220 drive transformer 230 through a diode 232 with the pulse transformer 230 in turn driving the gate of the SCR 4 by connection across the gate and cathode of the SCR 4. The darlington pair 220 also drives the transformer 234 through a diode 236 with the pulse transformer 234 driving the gate of the SCR 7 by connection across the gate and cathode of the SCR 7. The path activating circuits 200B and 200C are connected to pulse transformers which drive the SCR's corresponding to the conducting paths previously identified for power phases B and C.

The activation of the SCR's corresponding to the conducting paths for a given power phase can be inhibited by a ground potential connected to the conductor 238 of the corresponding power phase path activating circuit. For DC welding, either the positive or the negative half cycles of the three phase power can be passed to the arc 124 to generate either straight polarity or reverse polarity DC arc current, respectively. The polarity of the DC arc current is selected by inhibiting either the straight polarity conducting paths or the reverse polarity conducting paths by means of inhibit signals connected to the cathodes of the diodes 240 and 242. The enable/inhibit signals connected to the conductors 238 and the cathodes of the diodes 240 and 242 are generated by the circuitry shown in FIG. 5.

It is understood that the path control circuit shown in FIG. 2 is typical of many circuits which may be used to control the activation of the SCR's 1–8 to activate the conducting paths of the power supply in accordance with the present invention. The following table lists typical components for the path control circuit shown in FIG. 2.

TABLE I

| | |
|---|---|
| 204, 206, 208 | OP AMPS, 741 available from Motorola |
| 210, 212 | TRANSISTORS, 2N3904 available from Motorola |
| 214, 216 | 0.1 mfd |
| 218, 220 | TRANSISTORS, D45C5 available from General Electric |
| 222, 226, 230, 234, 276 | Pulse transformers |
| 224, 228, 232, 236, 240, 242, 243, 244, 245, 246, 249, 251 | DIODES, IN4001 available from Westinghouse |
| 252 | 5.6K ohm |
| 253, 267, 268 | 15K ohm |
| 254 | 0.15 mfd |
| 255 | 5K ohm potentiometer |
| 256 | 47K ohm |
| 257, 271, 274, 275 | 470 ohm |
| 258, 277, 278 | 0.047 mfd |
| 259, 260, 261, 262 | 10K ohm |
| 263, 264, 270, 273 | 1K ohm |
| 265, 266 | 3.9K ohm |
| 269, 272 | 2.2K ohm |

Figure 3:
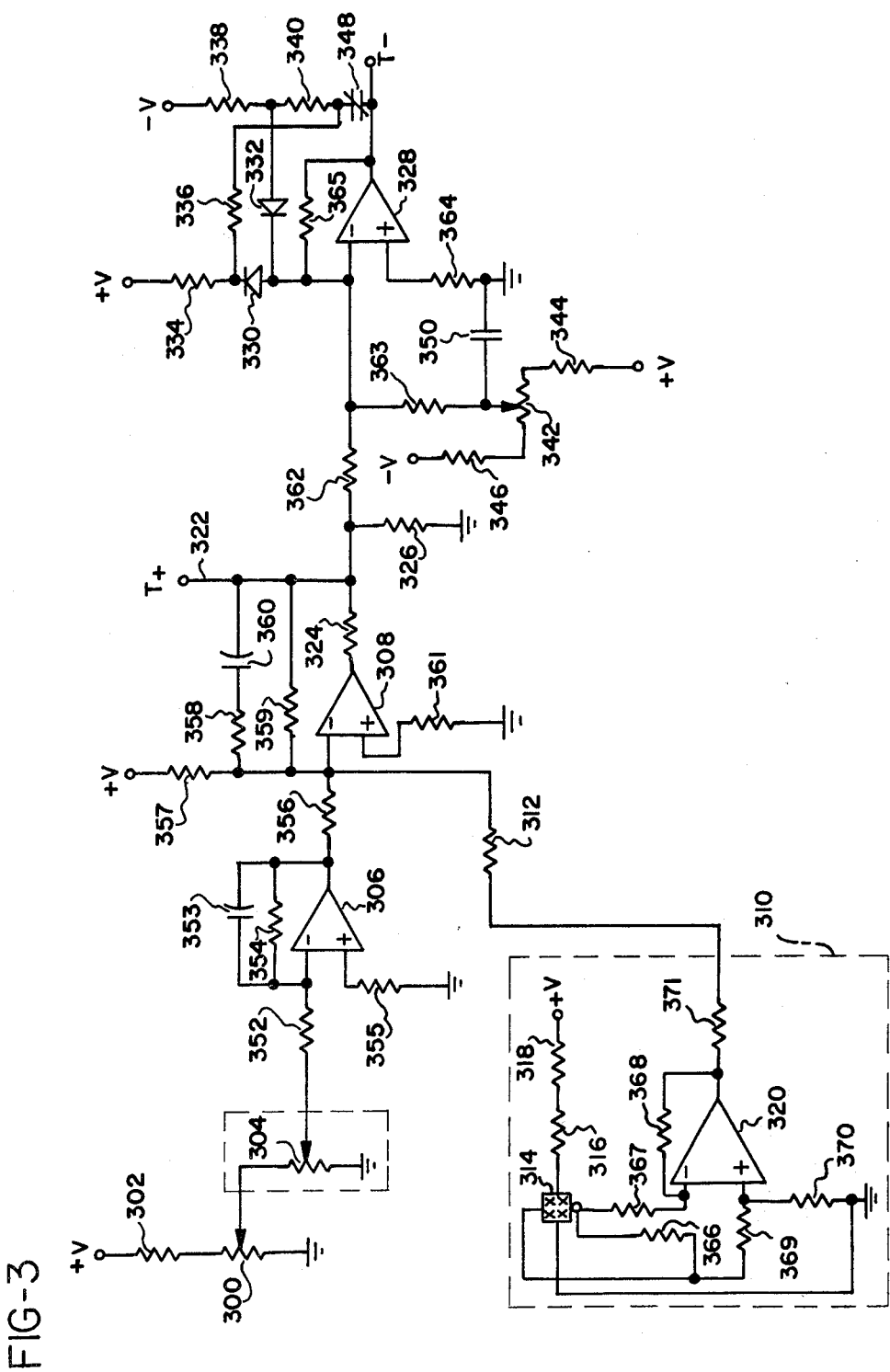

FIG. 3 is a schematic diagram of the circuitry for generating the threshold signals $T_+$ and $T_-$ which are used in the path activating circuits 200A, 200B and 200C to determine the phase angles at which the conducting paths are activated as previously described. The maximum welding current for a given application is selected by the variable resistor 300 which is connected to a positive supply $+V$ through the resistor 302. A second variable resistor 304 is connected to the wiper of the variable resistor 300 and allows the operator of the welding supply to select a welding current up to the maximum selected by the variable resistor 300. The variable resistor 304 is typically operated by a foot pedal for ease of control by the person operating the welding supply.

An operational amplifier 306 is connected as an inverting buffer amplifier and receives the requested welding current signal from the wiper of the variable resistor 304. The output of the operational amplifier 306 is connected to the negative input of the operational amplifier 308. A current feedback signal is generated by the circuitry 310 with the feedback signal also being connected to the negative input of the operational amplifier 308 through a resistor 312.

The feedback circuit 310 comprises a hall effect device 314 which has its power input terminals connected between the power supply +V and ground potential through the resistors 316 and 318 and its output terminals connected to the operational amplifier 320. The hall effect device 314 is inserted inside an air gap of a magnetic core which surrounds the supply cable which provides welding current to the arc. Such current monitoring arrangements are well known in the art and provide accurate flux monitoring and, hence, feedback signals representative of the current being fed to the welding arc 124.

The operational amplifier 320 is connected to generate a feedback signal which increases linearly as the current to the arc 124 increases. For zero arc current, the feedback signal is at approximately ground potential or a zero voltage level. The requested welding current signal from the operational amplifier 306 representative of the welding current requested by the operator is summed with the feedback signal from the operational amplifier 320 and amplified by the operational amplifier 308 to generate an error signal on the conductor 322 which serves as the T+ threshold signal for the path activating circuits 200A, 200B and 200C of FIG. 2. Thus, the phase angle at which the positive conducting paths are activated is selected in response to the sum of the requested welding current and the feedback signal representative of the actual welding current.

The lower the phase angle at which the conduction paths are activated, the higher the current provided to the welding arc 124. Thus, the specific phase angle at which conduction is commenced depends upon the balancing between the requested current signal and the feedback current signal. The resistors 324 and 326 limit the range of the T+ threshold signal to between +9 volts and −9 volts. The limits of the T+ threshold signal select the commencement of conduction of the positive conducting paths for the straight polarity arc current within a range of phase angles from 40° to 140°. An operational amplifier 328 is connected as an inverter to generate the threshold signals T− for the negative conducting paths.

To insure reignition of the arc upon transitions from straight polarity to reverse polarity, i.e., transitions from positive phase voltage half cycles to negative phase voltage half cycles, the range of the threshold voltage T− is also limited. The range limit is provided by the diodes 330, 332 and the interconnecting resistors 334, 336, 338 and 340. The limiting or clamping arrangement of the output signal of the operational amplifier 328 restricts the range of the threshold signal T− between +4 volts and −4 volts to thereby limit the range for the commencement of conduction of the negative conducting paths to phase angles from 70° to 110°.

Within the more limited range of phase angles, i.e., 70° to 110°, the negative conducting paths track the positive conducting paths so that both the positive and negative conducting paths are activated at the same phase angle. However, the tracking between the positive and negative conducting paths over the limited range of the negative conducting paths can be altered by moving the wiper of a variable resistor 342 from its center, ground potential position. The variable resistor 342 which is connected between positive and negative power supplies +V and −V by equal resistors 344 and 346 serves to control the phase angle at which the negative conducting paths commence conduction. Hence, the variable resistor 342 can be used to "fine-tune" the current output of the welding supply by unbalancing the conduction angles of the positive and negative half cycles. It is noted that imbalance normally occurs outside the more limited range of path activation for the negative half cycles, i.e., 70° to 110°, but such imbalance is necessitated to insure reignition of the arc current upon transitions from straight polarity to reverse polarity arc current.

Figure 5:
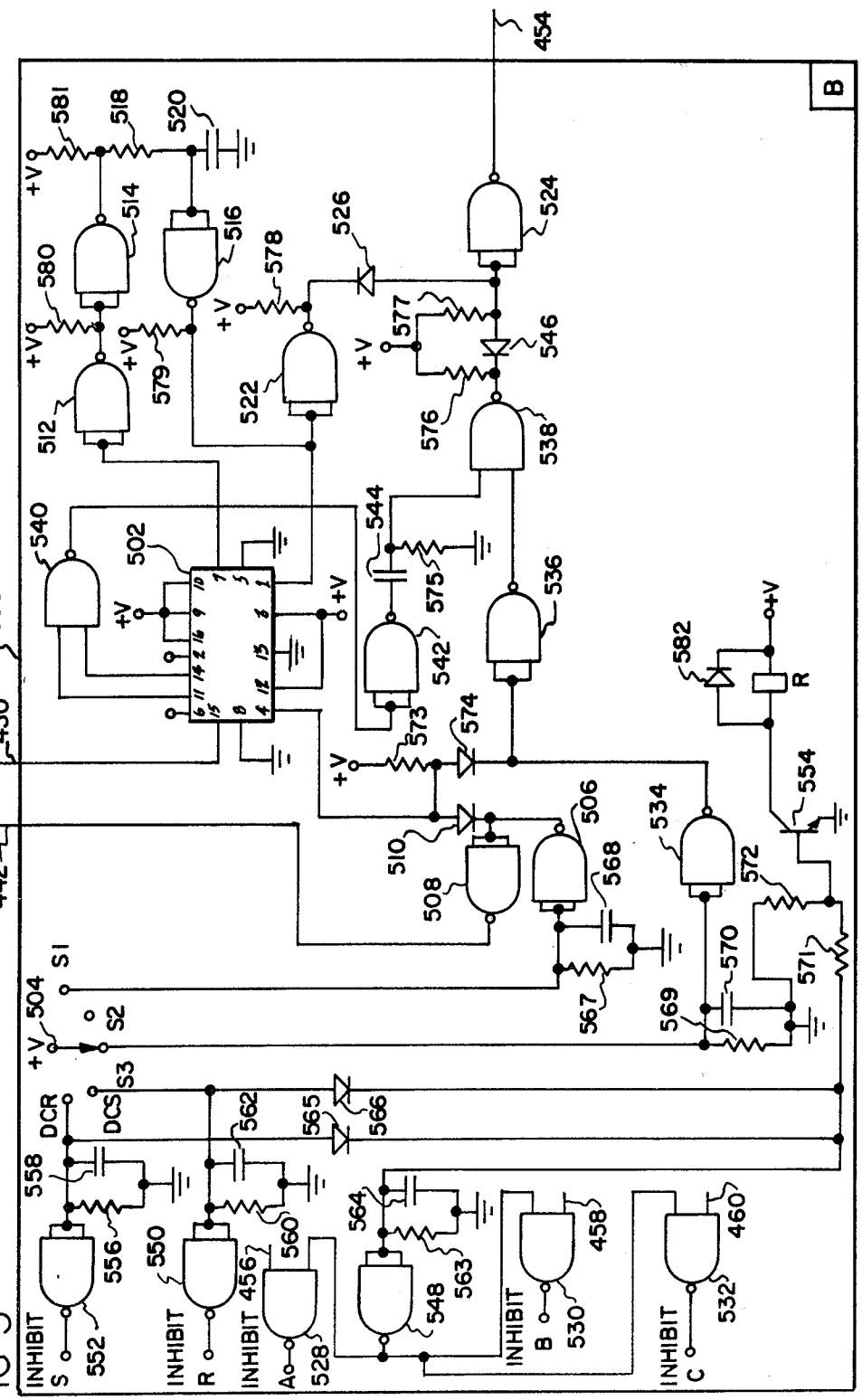

For DC welding current, the clamping action provided by the diodes 330, 332 and the potential effects of the variable resistor 342 are eliminated by the activation of a relay coil R shown in FIG. 5. The operation of the relay coil R opens the normally closed contact 348 and closes the normally open contact 350. The opening of the normally closed contact 348 removes the clamping effect of the diodes 330, 332 from the operational amplifier 328 and the closing of the normally open contact 350 applies ground potential to the wiper of the variable resistor 342 to eliminate any potential effects of the variable resistor 342.

The following table lists typical components for the circuitry as shown in FIG. 3.

TABLE II

| | |
|---|---|
| 300 | 5K ohm potentiometer |
| 302 | 2.7K ohm |
| 304 | 25K potentiometer |
| 306, 308, 320, 328 | OP AMPS, 741 available from Motorola |
| 312 | 9.09K ohm |
| 314 | HALL EFFECT DEVICE, HR66 available from Ohio Semitronics |
| 316, 318, 371 | 47 ohm |
| 324, 334, 338, 356 | 4.7K ohm |
| 326 | 2.2K ohm |
| 330, 332 | DIODES, IN4001 available from Westinghouse |
| 336, 340 | 1.5K ohm |
| 342 | 10K potentiometer |
| 344, 346 | 6.8K ohm |
| 352, 354, 362, 365, 366, 368, 370 | 100K ohm |
| 353 | 0.022 mfd |
| 355, 357, 363, 364 | 47K ohm |
| 358 | 15K ohm |
| 359 | 270K ohm |
| 360 | 0.1 mfd |
| 361, 367, 369 | 2.2K ohm |

Figure 4:
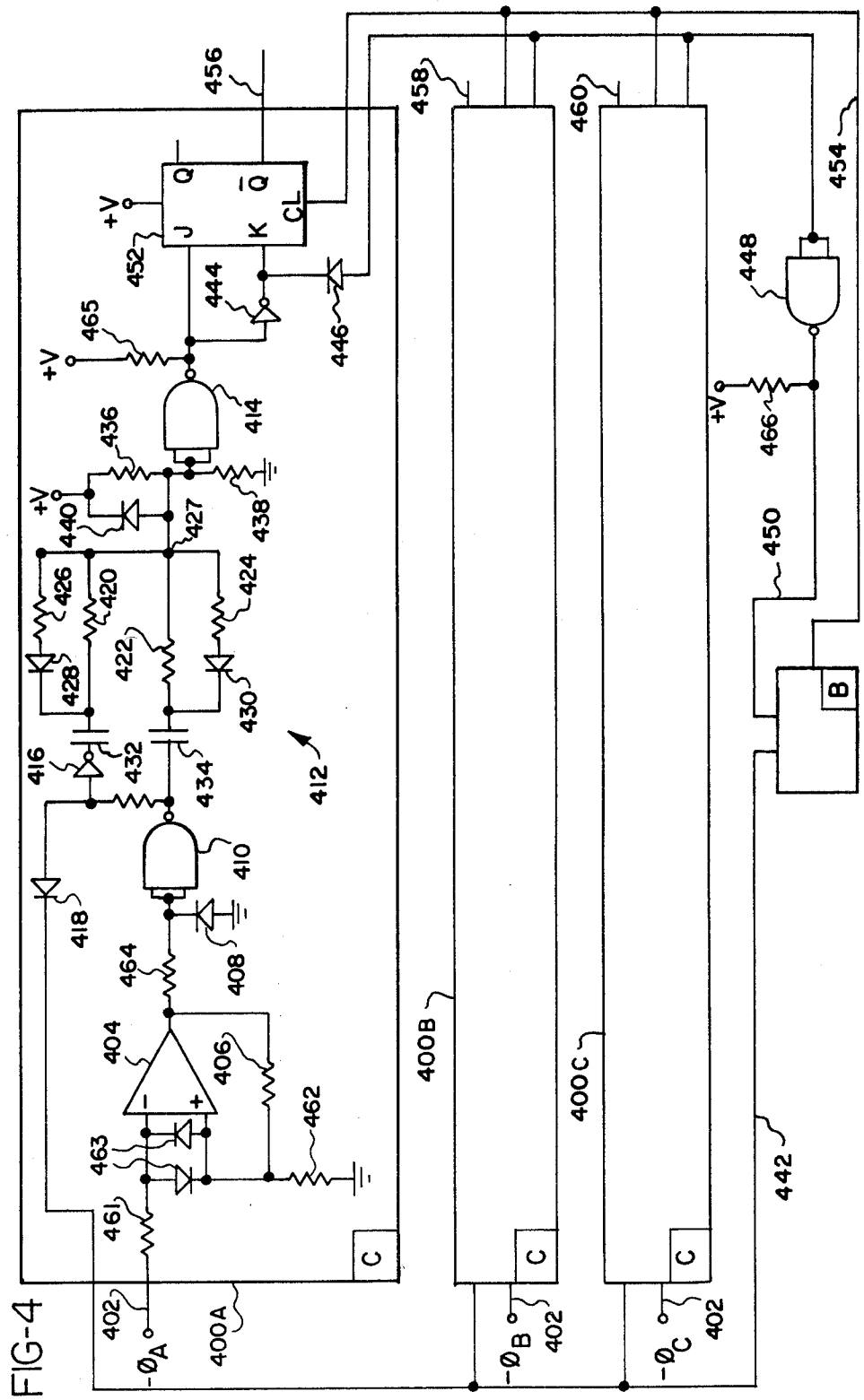

FIG. 4 is a schematic diagram of a circuit for generating timing pulses which are counted to sequence the activation of the conducting paths of the power control circuit to obtain a variety of duty cycles of straight polarity and reverse polarity arc currents. Timing pulses are generated for each of the three phases of the input supply by pulse generating circuits 400A, 400B, and 400C. Inverted phase voltages are generated electronically or by secondary windings (not shown) on the transformer 102 and connected to the input conductors 402 of the pulse generating circuits.

The inverted phase signals are passed to an operational amplifier 404 which is connected as a comparator circuit with hysteresis provided by a feedback resistor 406. The hysteresis of the comparator constructed from the operational amplifier 404 is such that the output signal of the operational amplifier 404 changes state at approximately 35° after the zero crossings of the phase voltage input on the conductor 402. Thus, the output of the operational amplifier 404 is a square wave corresponding to the phase voltage input signal on the conductor 402, but delayed in phase by approximately 35°.

The diode 408 clamps the input of a NAND gate 410 to ground potential to prevent damage to the NAND gate 410. The output of the NAND gate 410 is a square wave having high to low transitions at approximately 35° into the positive half cycle of the corresponding phase voltage waveform and having low to high transitions at approximately 35° into the negative half cycle of the corresponding phase voltage waveform. The circuitry 412 generates a low voltage or logical zero pulse which is connected to the input of the NAND gate 414 for each transition of the output signal of the NAND gate 410 unless the input of the inverter 416 is clamped to a low voltage or logical zero by the diode 418. If the input of the inverter 416 is clamped to ground potential, then pulses are generated only for the negative going transitions of the output signal of the NAND gate 410.

Operation of the circuitry 412 will initially be described with the cathode of the diode 418 left open circuited or connected to a high voltage or logical one signal. The resistors 420 and 422 are large relative to resistors 424 and 426, e.g., 15:1 resistance ratio. The resistors 424 and 426 are connected in parallel to the resistors 420 and 422 through diodes 428 and 430 poled as shown. Assuming that the output of the NAND gate 410 is high so that the output of the inverter 416 is low, the voltage difference is divided across capacitors 432 and 434 for steady state conditions. When the output signal of the NAND gate 410 goes low and the output signal of the inverter 416 goes high, the capacitors 432 and 434 can be considered to be constant voltage sources equal to approximately ½ V., i.e., one-half of the voltage swing of the logic elements.

An equivalent circuit for that instant of time is equal to a negative voltage supply of approximately ½ V connected to the junction 427 of the resistors 420, 422, 424 and 426 through a resistance approximately equal to one of the resistors 424, 426; and a second positive voltage supply of 1½ V connected to the junction 427 through a resistance equal to the resistance value of one of the resistors 420, 422. By superposition, it can be determined that a negative voltage would be generated at the junction 427. However, biasing resistors 436, 438 combine with the circuitry 412 to generate a logical zero voltage level which is applied to the input of the NAND gate 414. The biasing resistors 436, 438 limit the negative excursions of the signals from the circuitry 412 to prevent damage to the NAND gate 414.

When the output of the NAND gate 410 goes high and the output of the inverter 416 goes low, it can be seen that the functions of the circuit elements in the circuitry 412 reverse so that a similar potential is generated at the input of the NAND gate 414. Thus, a pulse is generated at the input of the NAND gate 414 for each half cycle of the input power phase.

For some timing sequences, as will be described hereinafter, only a single timing pulse is desired per cycle of the voltage waveform. In that event, the input to the inverter 416 is clamped to ground potential through the diode 418 so that the output of the inverter 416 is constantly at the high voltage potential of the logic circuit elements. A similar analysis of the circuitry 412 thus biased reveals that a low logic level on the input of the NAND gate 414 is generated only for high to low transitions of the output signal of the NAND gate 410. Since higher positive potentials can be generated when the input of the inverter 416 is clamped, a protection diode 440 is connected between the input of the NAND gate 414 and the positive logic supply +V.

The hysteresis voltage levels of the comparator are selected so that a positive voltage pulse is generated at the output of the NAND gate 414 at approximately 35° into the positive and the negative half cycles of the corresponding power input waveform if the input of the inverter 416 is not clamped via the diode 418; and a single pulse is generated approximately 35° into the positive going half cycle of the corresponding waveform if the input of the inverter 416 is clamped via the diode 418. The remainder of the circuitry shown on FIG. 4, as well as the clamping signal which is applied to the diodes 418 via conductor 442, relates to the circuitry shown in FIG. 5 which counts the pulses generated by the pulse generating circuitry of FIG. 4 and generates the inhibit/enable signals for the circuit of FIG. 2.

It is to be understood that the pulse generating circuitry shown in FIG. 4 is typical of many circuits which may be used to generate pulses from the incoming three phase power to serve as timing and sequencing pulses in the circuitry of FIG. 5. The following table lists typical components for the pulse generating circuitry shown in FIG. 4.

TABLE III

| | |
|---|---|
| 404 | OP AMP, 741 available from Motorola |
| 406 | 100K ohm |
| 408, 418, 428, 430, 440, 446 | DIODES, IN4001 available from Westinghouse |
| 410, 414, 448 | NAND GATES, MC672 available from Motorola |
| 416, 444 | INVERTER, MC680 available from Motorola |
| 420, 422, 461 | 15K ohm |
| 424, 426 | 1K ohm |
| 432, 434 | 0.1 mfd |
| 436 | 22K ohm |
| 438 | 47K ohm |
| 452 | JK FLIP FLOP, MC663 available from Motorola |
| 462 | 25K ohm |
| 463 | DIODE, IN4001 available from Westinghouse |
| 464, 465, 466 | 3.3K ohm |

The timing pulses for the three power phases generated at the output of the NAND gates 414 are passed to a counter circuit 502 via an inverter 444 and an isolating diode 446. The anodes of the isolating diodes 446 of the pulse generating circuits 400A, 400B and 400C are interconnected to the input of a NAND gate 448 whose output drives the clock input of the counter 502 via the conductor 450.

The duty cycles of the bipolar square wave welding current provided by the supply of the present invention are controlled by counting the timing pulses generated by the pulse generating circuitry shown in FIG. 4 and enabling repetitive sequences of positive and negative half cycles of the three phase power supply in response to selected counts of the timing pulses. The counter circuit 502 is preset to a defined count and then permitted to count timing pulses generated by the pulse generating circuitry of FIG. 4 until a carry-out signal is generated by the counter. Each carry-out signal serves to preset the counter 502 as well as clock storage devices associated with each of the power phase pulse generating circuits 400A, 400B and 400C so that enable signals can be appropriately generated for desired duty cycles of the welding arc current. Overall operation will be more fully described after a description of the various basic operating sequences of the circuitry shown in FIG. 5.

The selection of AC or DC welding current as well as the specific duty cycle for the AC welding current and the polarity of the DC welding current is performed by a switch 504. The switch 504 can be positioned to select AC welding sequences S1, S2 or S3 and either straight (DCS) or reverse (DCR) DC welding current.

For sequence 1, the switch 504 is set to terminal S1 so that a high potential is provided to the input of a NAND gate 506 making its output signal a low logic level and the output signal of a NAND gate 508 a high logic level. The input to pin 4 of the counter 502 is clamped to the low logic level by means of a diode 510. Input terminals 3, 4, 12 and 13 of the counter 502 define the preset state of the counter 502. A preset count defined by the signals on these input terminals is established in the four stages of the counter 502 when a high signal is applied to terminal 1 of the counter circuit. When the switch 504 is set to position S1, the counter 502 is preset to a count of 10 (binary 1010).

The pulse generating circuitry shown in FIG. 4 is set to generate two pulses per cycle for each phase of the input three phase power by a high signal on the conductor 442 from the NAND gate 508. Sequence 1 corresponds to the waveform shown in FIG. 6 wherein two positive half cycles followed by two negative half cycles are conducted to the arc 124. A review of the waveforms shown in FIG. 6 shows that the particular point of circuit start-up is immaterial since each phase voltage half cycle of each polarity can serve as the starting pulse for the counter 502. For sequence 1, the incoming timing pulses on the conductor 450 are counted from an initial preset count of 10 by the counter 502. Upon reaching a count of 15, a negative carry-out signal is generated on terminal 7 of the counter 502. A positive going pulse is generated at the output of a NAND gate 516 by NAND gates 512, 514 and 516 and a series connected resistor 518 and capacitor 520. The positive going pulse on the output of the NAND gate 516 serves to preset the counter 502 to a count of 10, as previously described, with the output pulse from the NAND gate 516 being held for a defined period of time due to the action of the resistor 518 and the capacitor 520.

The positive going pulse on the output of the NAND gate 516 is inverted by a NAND gate 522 and passed to a NAND gate 524 by a diode 526. Thus, a positive going pulse is generated at the output of the NAND gate 524 in response to the carry-out signal on terminal 7 of the counter 502. The output of the NAND gate 524 is connected to the clock input of a JK flip-flop 452 in each of the pulse generating circuits 400A, 400B and 400C via the conductor 454.

The duration of the pulse generated at the output of the NAND gate 414 is considerably longer than the stretched carry pulse generated on the conductor 454 at the output of the NAND gate 524. Accordingly, the power phase which caused the carry-out signal to be generated by the counter 502 is still present on the JK inputs of the JK flip-flop 542 of the corresponding pulse generator circuit 400A, 400B or 400C, and is clocked into the corresponding JK flip-flop by the low to high transition of the signal on the conductor 454. This generates an enable signal on the corresponding one of outputs 456, 458 or 460 which are respectively connected to one input of NAND gates 528, 530 and 532, the outputs of which are connected to the conductors 238 of the path activating circuits, 200A, 200B and 200C, shown in FIG. 2. The conducting paths for the phase which generated the timing pulse causing the last count, i.e., the carry-out signal, of the counter 502 is thus enabled. Repetitive operation for sequence 1 results in the waveforms shown in FIG. 6.

For sequence 2, the switch 504 is set to terminal S2 which is open circuited. This removes the high potential from S1 so that the output signal of the NAND gate 506 is high and correspondingly the output signal of the NAND gate 508 is low. This clamps the input to the inverters 416 of the pulse generating circuits 400A, 400B and 400C of FIG. 4 and provides a high signal to terminal 4 of the counter 502 via the diode 510. Accordingly, the counter 502 is preset to a count of 11 (binary 1011) by a high signal on its preset input terminal 1, and the pulse generating circuitry of FIG. 4 generates output pulses only for the positive going half cycles of the input three phase power, as previously described. The timing pulses are passed to the clock input 15 of the counter 502 via the conductor 450 to be counted by the counter 502. The remainder of the circuitry operates as described for sequence 1 so that when the counter reaches a count of 15 it is preset to 11 by the output signal of the NAND gate 516 and a clocking pulse is generated for the JK flip-flops 452 on the conductor 454 thus latching the JK flip-flop corresponding to the power phase which caused the last count, i.e., the carry-out signal, of the counter 502. The outputs of the JK flip-flops operate the same to enable the activation of the conducting paths for the corresponding power phase.

For sequence 3, the switch 504 is set to terminal S3 placing a high potential on the input to a NAND gate 534 which generates a low signal on its output. The low signal on the output of the NAND gate 534 clamps the preset input terminal 4 of the counter 502 to a low potential so that the counter 502 is again preset to a count of 10 by a high signal on the input terminal 1. The output of the NAND gate 508 remains low to clamp the input of the inverter 416 so that pulses are generated only for the positive going half cycles of the three phase power input signals. The low output signal from the NAND gate 534 generates a high signal on the output of a NAND gate 536 which enables a NAND gate 538 to respond to a count of 14 registered in the counter circuit 502. A count of 14 activates a NAND gate 540 which passes a low signal to a NAND gate 542. The output of the NAND gate 542 goes high and, due to a capacitor 544, generates a positive going pulse on an input of the NAND gate 538. The output of the NAND gate 538 is coupled to the input of the NAND gate 524 through a diode 546 so that a postive going clocking pulse is generated by the NAND gate 524 for the JK flip-flops 452 each time a count of 14 is registered in the counter 502. Thus, for sequence 3, when a count of 14 is registered in the counter 502, a clocking pulse is passed to the JK flip-flops 452 so that the input power phase causing the count to reach 14 is clocked into its corresponding JK flip-flop and in turn enables the activation of the conducting paths for that power phase in the manner previously described.

Upon the next count of the counter 502, a count of 15 is obtained which generates a carry-out signal on the terminal 7 of the counter to once again clock the JK flip-flops 452, as previously described, and preset a count of 10 into the counter 502. Thus, for sequence 3, the enabled conducting paths are changed at counts of 14 and 15 of the counter 502 or at every fourth and fifth timing pulse generated by the pulse generating circuitry shown in FIG. 4.

If the switch 504 is set to DC straight (DCS) or DC reverse (DCR), NAND gates 528, 530 and 532 are set to enable the conducting paths for all three phases by a low output signal from a NAND gate 548. However, either an inhibit reverse signal is generated by a NAND gate 550 or an inhibit straight signal is generated by a NAND gate 552 and passed to the path activating circuitry shown in FIG. 2. Accordingly, when straight DC polarity welding current is selected, only the positive or straight polarity half cycles of the three phase power input are passed to the arc 124; and when reverse DC welding current is selected, the straight polarity conducting paths are inhibited so that only the negative or reverse polarity half cycles of the three phase power input are passed to the arc 124. When DCS or DCR are selected by the switch 504, the relay coil R is activated via transistor 554 to disable the clamping circuitry associated with the operational amplifier 328 and the potential effects of the variable resistor 342 as previously described.

The following table lists typical components for the circuitry of FIG. 5.

TABLE IV

| | |
|---|---|
| 502 | COUNTER, CD4029B available from Motorola |
| 504 | 5 position switch |
| 506, 508, 512, 514, 516, 522, 524, 528, 530, 532, 534, 536, 538, 540, 542, 548, 550, 552 | NAND gates, MC672 available from Motorola |
| 510, 526, 546, 565, 566, 574, 582 | DIODES, IN4001 available from Westinghouse |
| 518 | 1K ohm |
| 520 | 0.02 mfd |
| 544 | 0.01 mfd |
| 554 | TRANSISTOR, 2N3904 available from Motorola |
| 556, 560, 563, 567, 569, 576, 578, 579, 580, 581 | 3.3K ohm |
| 558, 562, 564, 568, 570 | 0.022 mfd |
| 571, 572, 575 | 10K ohm |
| 573 | 4.7K ohm |
| 577 | 2.2K ohm |

The specific operation of the welding supply can now be described with reference to FIGS. 6-8, which correspond respectively to sequence 1, sequence 2 and sequence 3, as described above. The top waveform in each of the FIGS. 6-8 corresponds to the three phase power input with the phases being identified as A, B and C across the top of the waveforms. The second waveform from the top corresponds to the welding arc current generated by that sequence. The third, fourth and fifth waveforms from the top of the page correspond to the enable/inhibit for the conducting paths for the phases A, B and C, respectively, with the high portion of the waveform representing corresponding conducting paths being enabled, and the low portions of the waveform representing corresponding conducting paths being inhibited. The bottom two waveforms correspond respectively to the timing pulses generated by the pulse generating circuitry of FIG. 4 and to the JK clocking pulses which are generated on the conductor 454.

The clocking pulses on the conductor 454 are generated at approximately 35° into the positive going half cycles and the negative going half cycles of the three phase input voltages or only the positive going half cycles of the three phase inputs dependent upon the clamp signal supplied to the inputs of the inverters 416 of the pulse generating circuitry of FIG. 4. As previously described, the corresponding conducting paths are enabled at this time, i.e., approximately 35° into the positive and negative going or only positive going half cycles of the three phase power input waveforms. After the enable signals have been generated, the conducting paths enabled by those signals are activated by the path activating circuitry shown in FIG. 2 under the control of the circuitry shown in FIG. 3. Thus, the enabled conducting paths are activated at phase angles approximately between 40° and 140° from the zero crossing for the positive or straight polarity half cycles of the three phase power input and approximately between 70° and 110° from the zero crossing for the negative or reverse polarity half cycles of the three phase power input.

Figure 9:
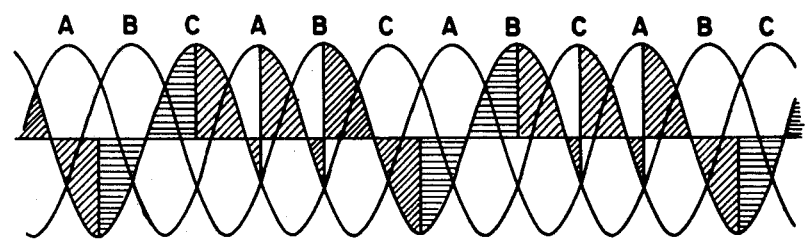
FIG. 9 is a portion of the uppermost waveform of FIG. 8 wherein the phase angle of activation of the conducting paths is approximately 90°.

As previously mentioned, inductive current flows not only for arc current polarity reversals as shown in FIGS. 6-8, but also for conduction of similar polarity half cycles when a conducting path is activated at phase angles greater than 60°. An example of the flow of such inductive current is shown in FIG. 9, where the phase angle of activation of the conducting paths is approximately 90°. FIG. 9 is a portion of the waveform of FIG. 8 with the phase angle of activation of the conducting paths changed to 90°.

It will be recognized that an improved welding supply for generating bipolar square wave welding currents having selectable duty cycles from a three phase power input has been disclosed. The illustrative embodiment provides for the selection of three different duty cycles for the arc current by selecting independent numbers of positive half cycles followed by independent numbers of negative half cycles of the three phase power input. This supply provides asymmetrical bipolar square wave welding current with minimal saturation of the input power transformer and thus improved power characteristics by means of the selection of the independent numbers of positive and negative half cycles.

It will also be noted that the frequency of the welding current is a fraction of the frequency of the input three phase power so that the noise of the arc current generated is reduced. It will be apparent to those skilled in the art that a variety of sequencing schemes similar to those disclosed herein can be provided to generate bipolar square wave welding waveforms in accordance with the present invention.

While the form of apparatus herein described constitutes a preferred embodiment of this invention, it is to be understood that the invention is not limited to this precise form of apparatus and that changes may be made therein without departing from the scope of the invention which is defined in the appended claims.

What is claimed is:

1. A controllable current supply for generating an alternating polarity square wave current for a welding arc comprising:

a power input for receiving three phase alternating current power;

a power control circuit connected in series with said power input and said welding arc, said power control circuit comprising:

three straight polarity conducting paths each comprising a phase related unidirectional input switching device connected to the corresponding phase of said power input, a common unidirectional output switching device connected to said arc and common inductor means connected between said input switching device and said output switching device of each of said straight polarity paths; and three reverse polarity conducting paths each comprising a phase related unidirectional input switching device connected to the corresponding phase of said power input and a common unidirectional output switching device connected to said arc, said inductor means also being common to said reverse polarity conducting paths and connected between said input switching device and said output switching device of each of said reverse polarity paths such that current flow is in the same direction through said inductor means whether a straight polarity conducting path is active or a reverse polarity conducting path is active;

path switching means synchronized with three phase power received on said power input for controlling said power control circuit to activate said conducting paths at defined non-zero voltage points of said three phase power; and timing means synchronized with three phase power received on said power input for enabling said path switching means to activate said conducting paths to conduct repetitive sequences of independent numbers of half cycles of each polarity of said three phase power.

2. The controllable current supply of claim 1 wherein said path switching means comprises:

control means for generating threshold signals for selecting said non-zero voltage points; and path activating means for activating said conducting paths as the voltage levels of the phases of said three phase power intercept said threshold signals.

3. The controllable current supply of claim 1 or 2 wherein said timing means comprises:

pulse means synchronized with said three phase power for generating pulses representative of the three phases thereof; and circuit means for counting said pulses and for enabling said path switching means in response to selected counts of said pulses.

4. The controllable current supply of claim 3 wherein said circuit means comprises:

counter means for counting said pulses; and gating means connected to said counter means for enabling said path switching means in response to defined counts of said counter means.

5. The controllable current supply of claim 4 wherein said pulse means generates a single pulse for each cycle of each phase of said three phase power, said counter means repetitively counting four pulses from said pulse means and said gating means enabling said path switching means to activate the conducting paths corresponding to the phase causing the fourth count of said counter means, said gating means changing the conducting paths enabled each time four pulses are counted.

6. The controllable current supply of claim 4 wherein said pulse means generates a single pulse for each cycle of said three phase power, said counter means repetitively counting five pulses from said pulse means and said gating means enabling said path switching means to activate the conducting paths corresponding to the phase causing the fourth and fifth counts of said counter means, said gating means changing the conducting paths enabled each time four pulses and five pulses are counted.

7. The controllable current supply of claim 4 wherein said pulse means generates a single pulse for each half cycle of each phase of said three phase power, said counter means repetitively counting five pulses from said pulse means and said gating means enabling said path switching means to activate the conducting paths corresponding to the phase causing the fifth count of said counter means, said gating means changing the conducting paths enabled each time five pulses are counted.

8. The controllable current supply of claim 4 further comprising duty cycle select means for controlling said counter means to count selected repetitive counts of said pulses and said gating means to be responsive to at least one counting state of said counter means.

9. The controllable current supply of claim 1 or 2 wherein said path switching means further comprises clamping means for limiting the activation of said reverse polarity conducting paths to a range of voltages near the maximum voltage for said three phase power.

10. The controllable current supply of claim 9 wherein said range of voltages is defined by the conduction angles between 70° and 110° from the zero crossing point for the reverse polarity half cycles.

11. A controllable current supply for generating an alternating polarity square wave current for a welding arc, comprising:

a power input for receiving three phase alternating current power;

a power circuit connected in series between said power input and said welding arc, said power circuit comprising three pairs of conducting paths respectively corresponding to said three phases of power with each pair of conducting paths comprising:

a straight polarity conducting path having a unidirectional input switching device connected to the corresponding phase of said power input, a common unidirectional output switching device connected to said arc and common inductor means connected between said input switching device and said output switching device of said straight polarity conducting path; and a reverse polarity conducting path having a unidirectional input switching device connected to the corresponding phase of said power input and a common unidirectional output switching device connected to said arc, said inductor means also being common to said reverse polarity conducting paths and connected between said input switching device and said output switching device of said reverse polarity conducting path such that current flow through said inductor means is in the same direction whether a straight polarity conducting path is active or a reverse polarity conducting path is active; and means for cyclically activating said conducting paths at selected non-zero voltage levels of said power phases to conduct at least two consecutively occurring negative half cycles of said power phases immediately followed by at least two consecutively occurring positive half cycles of said power phases.

12. A controllable current supply for generating an alternating polarity square wave current for a welding arc, comprising:
- a power input for receiving three phase alternating current power;
- a power circuit connected in series between said power input and said welding arc, said power circuit comprising three pairs of conducting paths respectively corresponding to said three phases of power with each pair of conducting paths comprising:
  - a straight polarity conducting path having a unidirectional input switching device connected to the corresponding phase of said power input, a common unidirectional output switching device connected to said arc and common inductor means connected between said input switching device and said output switching device of said straight polarity conducting path; and
  - a reverse polarity conducting path having a unidirectional input switching device connected to the corresponding phase of said power input and a common unidirectional output switching device connected to said arc, said inductor means also being common to said reverse polarity conducting paths and connected between said input switching device and said output switching device of said reverse polarity conducting path such that current flow through said inductor means is in the same direction whether a straight polarity conducting path is active or a reverse polarity conducting path is active; and
- means for cyclically activating said conducting paths at selected non-zero voltage levels of said power phases to conduct repetitive groupings of defined numbers of consecutively occurring positive half cycles of said power phases with said groupings being separated by at least one negative half cycle of one of said power phases.

13. The controllable current supply of claim 1, 2, 11 or 12 wherein said power circuit comprises a three phase bridge rectifier circuit comprising eight bridge arms each of said arms including a gate controlled thyristor, the alternating current input of said bridge being connected to said three phase power input and said inductor means being connected across direct current terminals of said bridge.

14. A controllable current supply for generating an alternating polarity square wave current for a welding arc comprising:
- a power input for receiving three phase alternating current power;
- a power control circuit connected in series with said power input and said welding arc, said power control circuit comprising:
  - three straight polarity conducting paths (1-8, 3-8, 5-8) corresponding to the three phases of power and each comprising a phase related unidirectional input switching device connected to the corresponding phase of said power input, a common unidirectional output switching device connected to said arc and common inductor means connected between said input switching device and said output switching device of each of said straight polarity conducting paths; and
  - three complementary reverse polarity conducting paths (2-7, 4-7, 6-7) each comprising a phase related unidirectional input switching device connected to the corresponding phase of said power input and a common unidirectional output switching device connected to said arc, said inductor means also being common to said reverse polarity conducting paths and connected between said input switching device and said output switching device of each of said reverse polarity conducting paths such that current flow is in the same direction through said inductor means whether a straight polarity conducting path is active or a reverse polarity conducting path is active;
- path switching means synchronized with said three phase power for controlling said power control circuit to activate said conducting paths at defined non-zero voltage points of said three phase power; and
- path timing means synchronized with said three phase power for enabling said path switching means to activate said conducting paths cyclically to conduct independent numbers or half cycles of each polarity of said three phase power, a pair of complementary conducting paths corresponding to one of said three phases of power being consecutively activated to produce arc current reversals with the second of said complementary pair of paths being activated while the arc current is being supplied through the first of said complementary pairs of paths by inductive current from said inductor means and is of opposite polarity to the voltage of the connected power phase, said consecutively activated pair of complementary conducting paths cooperating to form a circulating current path for said inductor means to permit the arc current to reverse in response to the voltage of the connected power phase with the first of said pair of complementary conducting paths being deactivated when said reversed current exceeds the current in said circulating current path.

15. The controllable current supply of claim 14 wherein each of said straight polarity conducting paths comprises a phase related silicon controlled rectifier (1, 3, 5) and a common silicon controlled rectifier (8), and each of said reverse polarity conducting paths comprises a phase related silicon controlled rectifier (2, 4, 6) and a common silicon controlled rectifier (7), said common silicon controlled rectifiers being connected to their corresponding phase related silicon controlled rectifiers through said inductor means.

* * * * *